(12) United States Patent
Manson et al.

(10) Patent No.: US 8,370,327 B2
(45) Date of Patent: *Feb. 5, 2013

(54) BOOK OF BUSINESS MECHANISM

(75) Inventors: Nicholas Manson, Kitchener (CA); Colin Toal, St. Thomas (CA); Wei Luo, Richmond Hill (CA); Chitra Mitra, Sunnyvale, CA (US); Julie Choi Adams, Oakland, CA (US); Adam Edmonds, Toronto (CA); Kevin James Viggers, Toronto (CA)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,206

(22) Filed: Apr. 5, 2012

(65) Prior Publication Data

US 2012/0191700 A1 Jul. 26, 2012

Related U.S. Application Data

(63) Continuation of application No. 11/866,545, filed on Oct. 3, 2007, now Pat. No. 8,171,017.

(51) Int. Cl.
*G06F 17/30* (2006.01)
(52) U.S. Cl. .................. 707/718; 707/723
(58) Field of Classification Search .......... 707/718, 707/723
See application file for complete search history.

(56) References Cited

U.S. PATENT DOCUMENTS

| 5,721,903 | A * | 2/1998 | Anand et al. ............... 707/603 |
| 5,910,987 | A * | 6/1999 | Ginter et al. ................ 705/52 |
| 5,917,489 | A | 6/1999 | Thurlow et al. |
| 5,917,912 | A * | 6/1999 | Ginter et al. ............... 713/187 |
| 7,076,494 | B1 * | 7/2006 | Baer et al. ..................... 1/1 |
| 7,620,570 | B2 | 11/2009 | Albazz et al. |
| 2008/0059500 | A1 | 3/2008 | Symens |
| 2009/0157711 | A1* | 6/2009 | Baer et al. ................. 707/101 |
| 2009/0254572 | A1* | 10/2009 | Redlich et al. ............. 707/10 |
| 2010/0257614 | A1* | 10/2010 | Ginter et al. ............... 726/28 |
| 2010/0313013 | A1* | 12/2010 | Ginter et al. ............. 713/155 |
| 2011/0208778 | A1* | 8/2011 | Mellmer et al. ........... 707/783 |

* cited by examiner

*Primary Examiner* — Kim Nguyen
(74) *Attorney, Agent, or Firm* — Kilpatrick Townsend & Stockton LLP

(57) ABSTRACT

A "Book of Business" (or Book) is a set of business domain data of one or more book types. This set of data is identified by a "driving condition" or quality. A driving condition typically arises from a business practice, and may be further qualified by local conditions. Accordingly, data may be organized based on local activities or conditions that may not be explicitly stored in a database. In one embodiment, a method for querying the database includes identifying data in a database. The data is organized into one or more segments. A book of business associated with a segment in the one or more segments is then generated. The book of business includes a set of references to the data organized into the segment. A query plan may be determined based on the book of business. A set of results may then be generated based on the query plan.

20 Claims, 11 Drawing Sheets

Book Hierarchy Help Tutorial Back to User & Access Control Management　　　　　　　　　Printer Friendly

| AA List | [New] [Menu] | | | | Translation Language: English-American |
|---|---|---|---|---|---|

500

All 0-9 A B C D E F G H I J K L M N O P Q R S T U V W X Y Z　　　Previous | Next

| | Book Name ▲ | Book Type | Parent Book | Description | Modified By |
|---|---|---|---|---|---|
| Copy Edit Delete | Central — 510 | Region | WW Sales | | |
| Copy Edit Delete | East | Region — 520 | WW Sales — 530 | | |
| Copy Edit Delete | North-East | Market | East | | |
| Copy Edit Delete | South-East | Market | East | | |
| Copy Edit Delete | West | Region | WW Sales | | |
| Copy Edit Delete | WW Sales | Region | | | |

FIG. 5

Account Detail: Very Large Account | Back to Account Homepage

Edit Layout | Help | Printer Friendly

Account Detail [ New ] [ Edit ] [ Delete ] [ Merge ]

⊞ Key Account Information:

Account Name Very Large Account      Annual Revenues $1,000,000.00

Industry Financial Services      Account Currency USD

⊞ Account Sales Information:

⊞ Additional Information:

⊞ Books [ Add ]

| Name | Book Type | Automatic Association |
|------|-----------|----------------------|
| Remove New York City | | ☐ |
| Remove High Value Accounts | | ☑ |

Show Full List

Workflow Rule Detail | Back to Workflow Rules List

Help | Printer Friendly

⬛ Workflow Rule Details [ New ] [ Edit ] [ Delete ]

☐ Key Workflow Rule Details

| | |
|---|---|
| Workflow Name  High Value Accounts Rule | Record Type  Account |
| Active  ☑ | Trigger Event  When modified record saved |
| Created By  BookTest BookTest 6/5/2007 02:05 PM | Modified By  BookTest BookTest 6/5/2007 02:05 PM |

Workflow Rule Condition  [<AnnualRevenues>] > 100000

⬛ Actions [ Menu ▼ ] [ Edit Order ]

| | Order | Active | Name | Type | Last Modified |
|---|---|---|---|---|---|
| Delete  Edit | 1 | ☑ | Assign High Value Account Book | Book Assign | nicholas.manson 06/05/2007 14:06:26 |

Number of records displayed: 25 ▾

Book Detail: Oregon New | Edit | Delete    Help Tutorial Back to Territory Hierarchy    Printer Friendly

Book Details

Key Book Information:

Book Name  Oregon
Book Type  Market

Parent Book  Northwest
Can Contain Data  ☐

Additional Information:

Created By  Joanne Brown 12/17/2005 01:02 PM
Description  All territories

Modified By  Joanne Brown 12/20/2005 10:23 AM

Sub Books New

| | Book Name | Book Type | Can Contain Data ~840 |
|---|---|---|---|
| Edit Remove | Bob's Territory | Territory | ☑ |
| Edit Remove | Phil's Territory | Territory | |
| Edit Remove | Mary's Territory | Territory | ☑ |

Show Full List

Book Users Add Users | Edit Users

| | Last Name | First Name | Book Role ~860 | Access Profile ~870 |
|---|---|---|---|---|
| Remove | Bobson | Bob | Owner | Sales Manager Profile |
| Remove | Smith | Cate | Admin | Sales Engr Profile |
| Remove | Wells | Fran | Assistant | AAA Profile |

Show Full List

FIG. 8

BOOK OF BUSINESS MECHANISM

CROSS-REFERENCES TO RELATED APPLICATIONS

This application is a Continuation of U.S. patent application Ser. No. 11/866,545, filed Oct. 3, 2007 and entitled "Book of Business Mechanism," which is incorporated herein by reference in its entirety for all purposes.

BACKGROUND OF THE INVENTION

The present invention relates to information systems. More specifically, the present invention relates to techniques for information retrieval using book of business mechanisms.

Traditional enterprise applications use a database to separate the responsibility of managing fast access to data from the responsibility of defining business processing based on the data. This approach gave rise to a special class of information technology (IT) employee called a database administrator (DBA). In general, the DBA has the task to optimize data access to the particular needs of business processes given a particular company's data volumes.

Large data volumes are typically owned by large companies with big IT budgets, and databases are ordinarily quite good at dealing with small data volumes without constant supervision from a DBA. So, the needs of large companies and small applications are served well by the above traditional approach. Furthermore, the system artifacts produced by a DBA can be replicated. So, the DBA's effort can be packaged with the application in cases where common queries are identified that apply to all application customers.

However, the traditional approach does not cover all cases. Specifically, it is difficult for groups with small budgets to deal with large data volumes in processes where the groups require novel queries. Typically, such groups are required to employ a DBA, abandon their novel queries, or live with poor performance.

Unfortunately, the "high volume/low value/novel query" use case describes many business processes. In one example, consider the sales prospecting process. In this example, a prospecting team must work through a large volume of low value leads in order to produce a few high value opportunities. Furthermore, the team's data mining process changes frequently in order to maintain their success rate.

The "high volume/low value/novel query" use case is also demonstrated when large companies attempt to lower their total cost of ownership (TCO) for software. In such situations, companies naturally trim back on areas that do not directly generate revenue. Such companies desire lower maintenance applications that adapt to more use-cases without the cost of custom tailoring by experts like DBAs. Thus, more companies are moving toward the hosted software phenomenon, which further removes control of the data from the companies.

Accordingly, what is desired are improved methods and apparatus for solving the problems discussed above. Additionally, what is desired are improved methods and apparatus for reducing some of the drawbacks discussed above.

BRIEF SUMMARY OF THE INVENTION

The present invention relates to information systems. More specifically, the present invention relates to techniques for information retrieval using book of business mechanisms.

In various embodiments, a "Book of Business" (or Book) is a set of business domain data of one or more book types. This set of data is identified by a "driving condition" or quality. A driving condition typically arises from a business practice, and may be further qualified by local conditions. Accordingly, data may be organized, segmented, or subdivided based on local activities or conditions that may not be explicitly stored in a database. In one embodiment, a method for organizing a database includes identifying data stored in the database. The data is organized into one or more of a series of segments. A book of business associated a segment in the one or more segments is then generated. The book of business includes a set of references to the related data organized into the segment.

In some embodiments, organizing the data into one or more segments includes organizing the data into the one or more segments based on a set of criteria. The book of business may specify a query domain associated with the data in the segment. The book of business may also specify a set of queries associated with the data in the segment.

In one embodiment, the method further includes associating one or more tasks with the book of business. One of the tasks may be performed in response to selection of the book of business. Generating the book of business associated with the segment may include generating the book of business within a book hierarchy. The method may further include determining ownership information associated with the book of business. Determining the query plan based on the book of business may include determining the query plan based on the ownership information.

In further embodiments, a method for querying a database includes organizing data stored in a database into one or more segments. Each segment of the one or more segments is associated with a book of business. The book of business includes a set of references to the data organized into the segment. A query plan is determined based on the book of business. A set of results is then generated based on the query plan. In one embodiment, the book of business specifies a query domain associated with the data in the segment. Determining the query plan based on the book of business may include determining a set of queries associated with the data in the segment based on the book of business.

In one embodiment, a computer program product includes a computer readable medium for storing a set of code modules which when executed by a processor of a computer system cause the processor to organize a database. The computer program product includes code for identifying data stored in the database, code for organizing the data into one or more segments, and code for generating a book of business associated a segment in the one or more segments, the book of business comprises a set of references to the data organized into the segment.

In yet another embodiment, a computer program product includes code for organizing data stored in a database into one or more segments, wherein each segment of the one or more segments is associated with a book of business comprising a set of references to the data organized into the segment, code for determining a query plan based on the book of business, and code for generating a set of results based on the query plan.

In various embodiments, a data processing system includes a processor and a memory coupled to the processor. The memory is configured to store a set of instructions which when executed by the processor cause the processor to perform a method for organizing a database. The method includes identifying data stored in the database, organizing the data into one or more segments, and generating a book of business associated a segment in the one or more segments, the book of business comprises a set of references to the data organized into the segment.

In some embodiments, a data processing system performs a method for querying a database, the method including organizing data stored in a database into one or more segments, wherein each segment of the one or more segments is associated with a book of business comprising a set of references to the data organized into the segment, determining a query plan based on the book of business, and generating a set of results based on the query plan.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIG. 5 is a screenshot illustrating one example of a user interface for creating a book of business in one embodiment according to the present invention;

FIG. 6 is a screenshot illustrating one example of a user interface for manually associating data with a book of business in one embodiment according to the present invention;

FIG. 7 is a screenshot illustrating one example of a user interface for creating a business rule for automatically associating data with a book of business in one embodiment according to the present invention;

FIG. 8 is a screenshot illustrating one example of a user interface for viewing and editing details of a book of business in one embodiment according to the present invention;

DETAILED DESCRIPTION OF THE INVENTION

The present invention relates to information systems. More specifically, the present invention relates to techniques for information retrieval using book of business mechanisms.

In general, a "Book of Business" (or Book) is a set of business domain data of one or more book types. This set of data is identified by a "driving condition" or quality. A driving condition typically arises from a business practice, and may be further qualified by local conditions. For example, management of an organization may decide that a single manager should "own" accounts from each major city (a data attribute that may be stored in a database). The manager from New York may decide that the resulting account list is too large to manage without delegation. Accordingly, the manager may further segment, segment, or subdivide the accounts (e.g., the data representing the accounts) based on account activity (a data attribute that may not be explicitly stored in the database).

A segment is an organizational business entity such as a "division," "territory," or "corporate account." In various embodiments, one or more segments or segments exist in a segment hierarchy. Books form the nodes of the segment hierarchy. Segments associate a set of segment users with the hierarchy and the set of Books. Segments can arise from the business practice of grouping employees with the business domain data to which they need regular access (e.g., to perform day-to-day tasks). Segments may be constructed according to some pre-existing business or organization hierarchy (e.g., org. chart, product line, geographic, etc).

Figure 1:
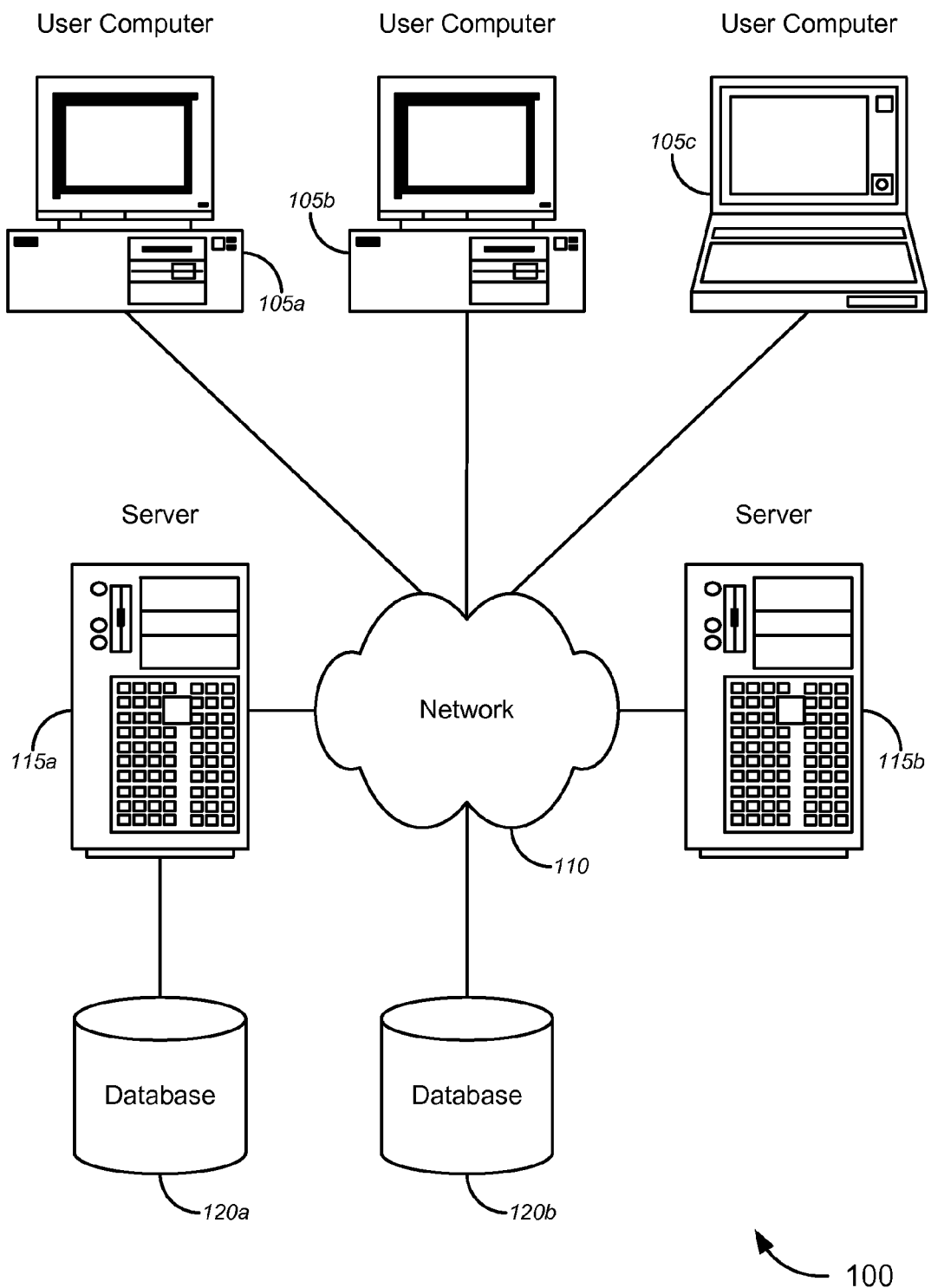
FIG. 1 is a simplified illustration of a system that may incorporate an embodiment of the present invention.

FIG. 1 is a simplified illustration of a system 100 that may incorporate an embodiment of the present invention. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 105 (e.g., computers 105a, 105b, and 105c). User computers 105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 105 can also have any of a variety of applications, including one or more applications configured to perform methods of the invention, as well as one or more office applications, database client and/or server applications, and web browser applications.

Alternatively, user computers 105 can be any other electronic device, such as a thin-client computer, Internet-enabled mobile telephone, and/or personal digital assistant, capable of communicating via a network (e.g., network 110 described below) and/or displaying and navigating web pages or other types of electronic documents. Although the exemplary system 100 is shown with three user computers, any number of user computers can be supported.

Certain embodiments of the invention operate in a networked environment, which can include a network 110. Network 110 can be any type of network familiar to those skilled in the art that can support data communications using any of a variety of commercially-available protocols, including without limitation TCP/IP, SNA, IPX, AppleTalk, and the like. Merely by way of example, network 110 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 115 (e.g., computers 115a and 115b). Each of server computers 115 may be configured with an operating system including without limitation any of those discussed above, as well as any commercially-available server operating systems. Each of server computers 115 may also be running one or more applications, which can be configured to provide services to one or more clients (e.g., user computers 105) and/or other servers (e.g., server computers 115).

Merely by way of example, one of server computers 115 may be a web server, which can be used, merely by way of example, to process requests for web pages or other electronic documents from user computers 105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 105 to perform methods of the invention.

Server computers 115, in some embodiments, might include one ore more file and or/application servers, which can include one or more applications accessible by a client running on one or more of user computers 105 and/or other server computers 115. Merely by way of example, one or more of server computers 115 can be one or more general purpose computers capable of executing programs or scripts in response to user computers 105 and/or other server computers 115, including without limitation web applications (which might, in some cases, be configured to perform methods of the invention).

Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on one of user computers 105 and/or another of server computer 115.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to a user computer 105 via a web server (as described above, for example). Similarly, a web server might receive web page requests and/or input data from one of user computers 105 and/or forward the web page requests and/or input data to an application server.

In accordance with further embodiments, one or more of server computers 115 can function as a file server and/or can include one or more of the files necessary to implement methods of the invention incorporated by an application running on a user computer 105 and/or another server 115. Alternatively, as those skilled in the art will appreciate, a file server can include all necessary files, allowing such an application to be invoked remotely by one or more of user computers 105 and/or server computers 115. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 120 (e.g., databases 120a and 120b). The location of the database(s) 120 is discretionary: merely by way of example, a database 120a might reside on a storage medium local to (and/or resident in) server computer 115a (and/or one or more of user computers 105). Alternatively, a database 120b can be remote from any or all of user computers 105 and server computers 115, so long as it can be in communication (e.g., via network 110) with one or more of these. In a particular set of embodiments, databases 120 can reside in a storage-area network ("SAN") familiar to those skilled in the art. (Likewise, any necessary files for performing the functions attributed to user computers 105 and server computers 115 can be stored locally on the respective computer and/or remotely, as appropriate). In one set of embodiments, one or more of databases 120 can be a relational database, such as an Oracle database, that is adapted to store, update, and retrieve data in response to SQL-formatted commands. Databases 120 might be controlled and/or maintained by a database server, as described above, for example.

In various embodiments, system 100 includes a "Book of Business" mechanism to enhance list and search performance by allowing users to select from smaller segmented sets of data. The "Book of Business" mechanism helps address the problem of predictable performance when handling large volumes of data (e.g., high volume/low value) within a company. The "Book of Business" mechanism provides querying of large volumes of data such that the subset of the data that is necessary to satisfy the current SQL request may be efficiently selected, and the subset my be efficiently processed to return the data in the form (typically, the order) requested.

In various embodiments, the "Book of Business" mechanism defines a single mechanism for subsetting data (e.g., Books) that can be extended and re-purposed to solve a particular user's business problems. Additionally, the subsets or Books are implemented in such a way as to contain the processing cost so long as a query on the subsetted data constrains itself to a single subset. Thus, the problem of producing new or novel queries that perform for business problems can be delegated to the user in the case of hosted environments rather than a dedicated DBA. The user can deciding on an individual subset structure and trade between convenience (fewer queries over larger subsets) and performance (more queries over smaller subsets).

To illustrate an example in explaining the subsetting concept, the term Book has been borrowed from the financial verticals as the name for each subset. In financial verticals, a "book of business" is a set of accounts that are "owned" by a broker. Brokers may temporarily delegate authority to others to manage their "book." In addition, the set of accounts under administration by a company is the sum of the accounts listed in all "books." Thus, the financial vertical concept of a "book of business" was a good match with the functional requirements for data management in other large businesses.

The "Book of Business" mechanism addresses the "high volume/low value/novel query" case through a combination of schema, indexing patterns, interfaces, and a query optimization subsystem. The "Book of Business" mechanism centers on using a concept of a "Book of Business." A "Book of Business" (or Book) refers to a business-neutral collection of data. No single piece of data is seen as the primary entry in the Book. Further, a "Book of Business" allows data entities to be related with multiple books through a classic "Many to Many" relationship.

In some embodiments, a Book hierarchy is created. In general, a Book hierarchy includes one or more nodes in a hierarchy that segments or segments data on predetermined criteria, such as business drivers like territory and product, or for purely performance reasons. All Books in a hierarchy can potentially contain data. In some embodiments, for performance reasons, some Books may include a maximum limit on the number of records (e.g., 20-30 k) and may not include cross-listed data (i.e., data should only exist in one place per hierarchy).

Typically, databases perform better with smaller sets of data. Often, it is difficult for a user in a large company to restrict their work to the right sized set of data. Accordingly, system 100 provides a "Book of Business" mechanism to explicitly select a smaller set of data to potentially services day-to-day tasks of a user in an organization.

Figure 2:
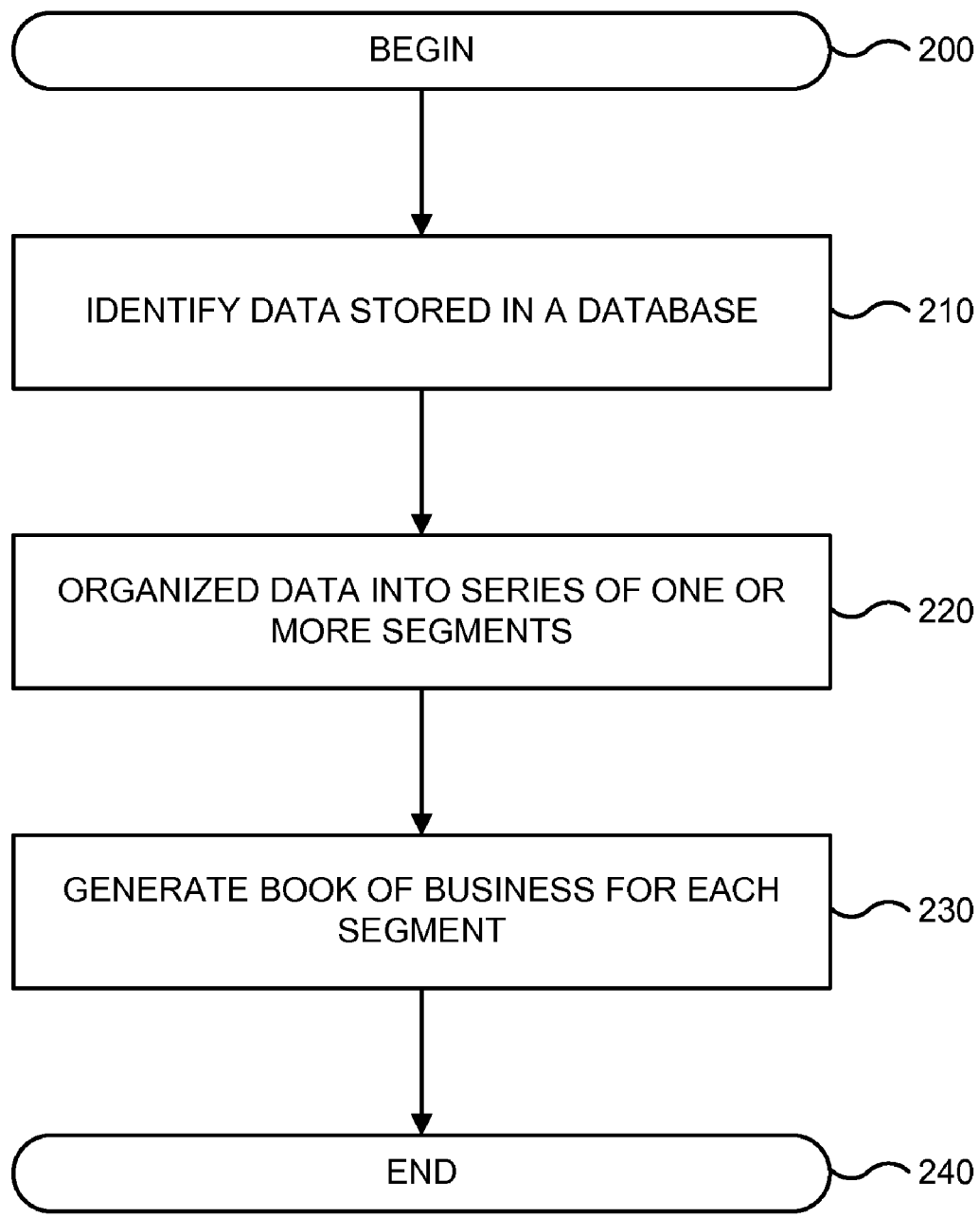
FIG. 2 is a flowchart of a method for creating a book of business in one embodiment according to the present invention.

FIG. 2 is a flowchart of a method for creating a book of business in one embodiment according to the present invention. The processing depicted in FIG. 2 may be performed by software modules (e.g., instructions or code) executed by a processor of a computer system, by hardware modules of the computer system, or combinations thereof. FIG. 2 begins in step 200.

In step 210, data stored in a database is identified. In step 220, the data is organized into a series of one or more segments. A segment may be any subset, grouping, collection, and the like, of data. In one example, the data is stored in a relational database. In some embodiments, a user or administrator provides the segmenting or grouping of the data. In further embodiments, the segment is provided by inherent attributes or characteristics of the data. For example, data may be segmented or grouped based on organizational hierarchy and structure, geography, territories, politics, gender, race, products, product groups, and the like.

In step 230, a book of business (or Book) is generated a segment (e.g., each of the series of one or more segments). As discussed above, the Book explicitly selects a smaller set of data (e.g., the segment of data) to service day-to-day tasks of a user in an organization. Some examples of tasks are accessing client information, tracking leads and contacts, viewing product sales and information by territory, and the like. Accordingly, the Book allows users to select from smaller segmented sets of data for increased performance. Additionally, the Book is not required to be maintained by a dedicated DBA. FIG. 2 ends in step 240.

In various embodiments, the "Book of Business" mechanism groups data to Books, and requires users to get their data access through the Books. Accordingly, ownership information or access control may be provided. In some embodiments, a team-based permission algorithm is used. A team-based permission algorithm returns the record permissions associated with a given user by means of the team (e.g., a sales team). Additionally, an access profile may be provided using an access control engine.

In various embodiments, ownership information may be associated with the segment and/or Book. In one example, flat user-level ownership information is associated with the segment and/of Book. In another example, hierarchical group-based ownership information is associated with the segment and/of Book. In some embodiments, the ownership information includes access controls and other information for specifying who can access data, what data may be access, where the data may be access, and when the data may be access.

In some embodiments, as the data is associated with a Book, indexes are populated which contain a book identifier and one or more key attributes from the data entry. The indexes may be used to allow a data access system to rapidly find contents of a single book. A typical implementation would use standard database indexes. However, other possibilities exist. The data's key attributes may be used by the data access system to optimally sort or filter the book's contents to satisfy any common queries that can be determined in advance of deployment. The book association provides the basis of the system's ability to handle novel queries.

Figure 3:
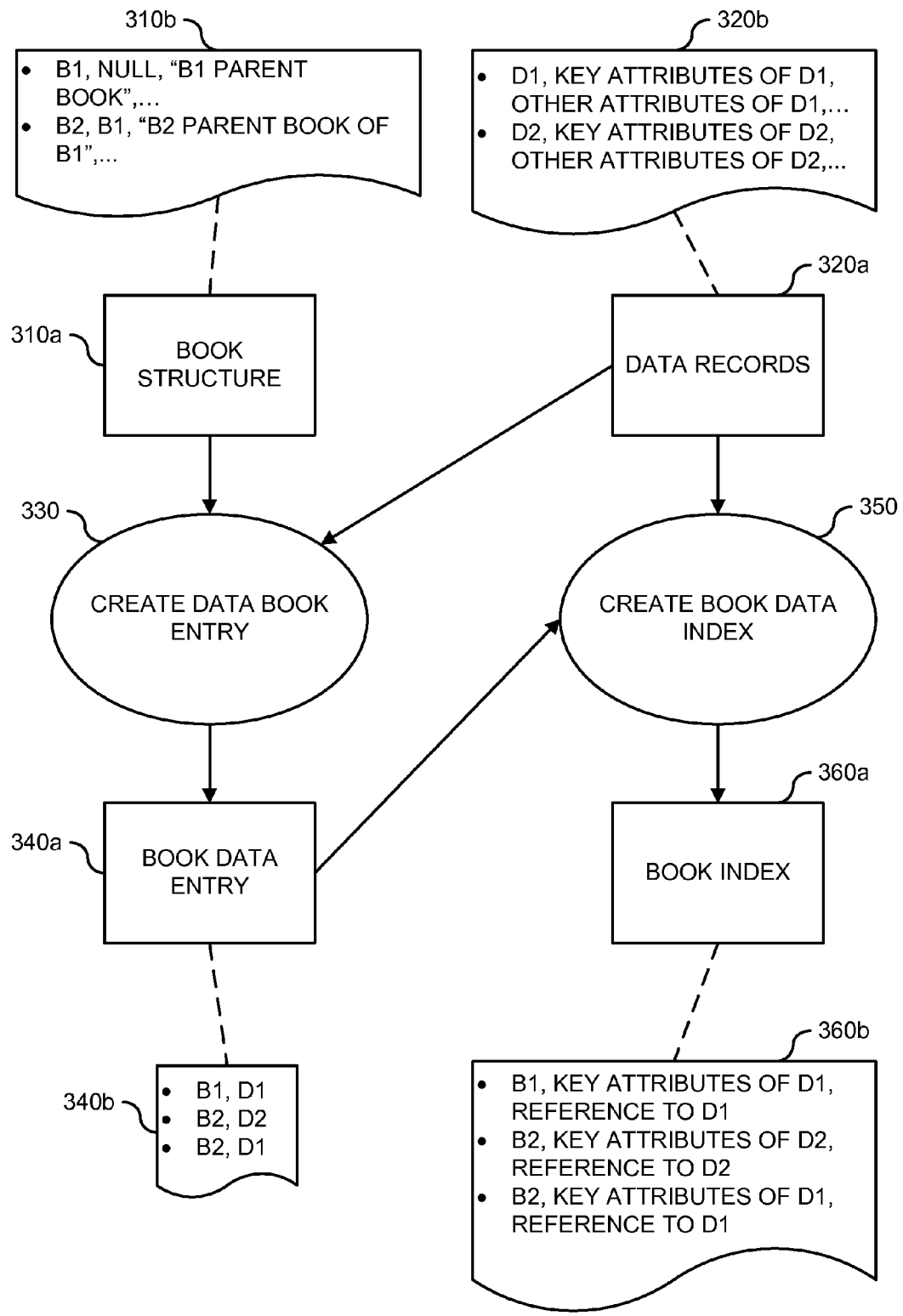
FIG. 3 is a data flow diagram illustrating formulation of a book index given data records and book of business records in one embodiment according to the present invention.

FIG. 3 is a data flow diagram illustrating formulation of a book index given data records and book of business records in one embodiment according to the present invention. In general, system 100 uses identifying information from a Book and from information from the data to construct a book entry. In this example, in block 310*a,* system 100 uses book structure information shown in block 310*b* (e.g., <B1, NULL, "B1 PARENT BOOK", . . . >; <B2, B1, "B2 PARENT BOOK OF B1", . . . >). In block 320*a,* system 100 uses data records shown in block 320*b* (e.g., <D1, KEY ATTRIBUTES OF D1, OTHER ATTRIBUTES OF D1, . . . >; <D2, KEY ATTRIBUTES OF D2, OTHER ATTRIBUTES OF D2, . . . >). In block 330, a data book entries 340*a* are created using book structure information 310*a* and data records 320*a*. Data block entries 340*a* are shown in block 340*b* (e.g., <B1, D1>; <B2, D2>; <B2, D1>).

Then, in block 350, system 100 supplements book data entries 340*a* with one or more key attributes from block 320*a* to form book index entries 360*a*. Book index entries 360*a* are shown in block 360*b* (e.g., <B1, KEY ATTRIBUTES OF D1, REFERENCE TO D1>; <B2, KEY ATTRIBUTES OF D2, REFERENCE TO D2>; <B2, KEY ATTRIBUTES OF D1, REFERENCE TO D1>).

In a database embodiment, the identifying information may form a foreign key to the source record. In some embodiments, the data entry and the data index entry are co-located. In various embodiments, if system 100 supplements the index with key data attributes, system 100 may keep the copied attribute values synchronized with the actual attribute values on the base record. In one embodiment, a database trigger may be used to keep the copied attribute values synchronized with the actual attribute values on the base record.

Thus, the book index provides the data necessary to quickly identify the data in a Book. The "Book of Business" allows formulation of queries and indexes that tightly constrain processing to the contents of the Book based on the book selected by the query.

In various embodiments, Books may be re-purposed to a variety of business problems, have a M-M relationship with any data type, have a M-M relationship with employees or users, and have a hierarchical self-relationship.

In one example of operation, the "Book of Business" mechanism may be used within data structures provided by Siebel Systems Inc. (or Oracle Corporation) stand-alone or Oracle Siebel On Demand™ products. In some embodiments, group, category, division, position, and employee-based visibility may be used to segment data.

Figure 4:
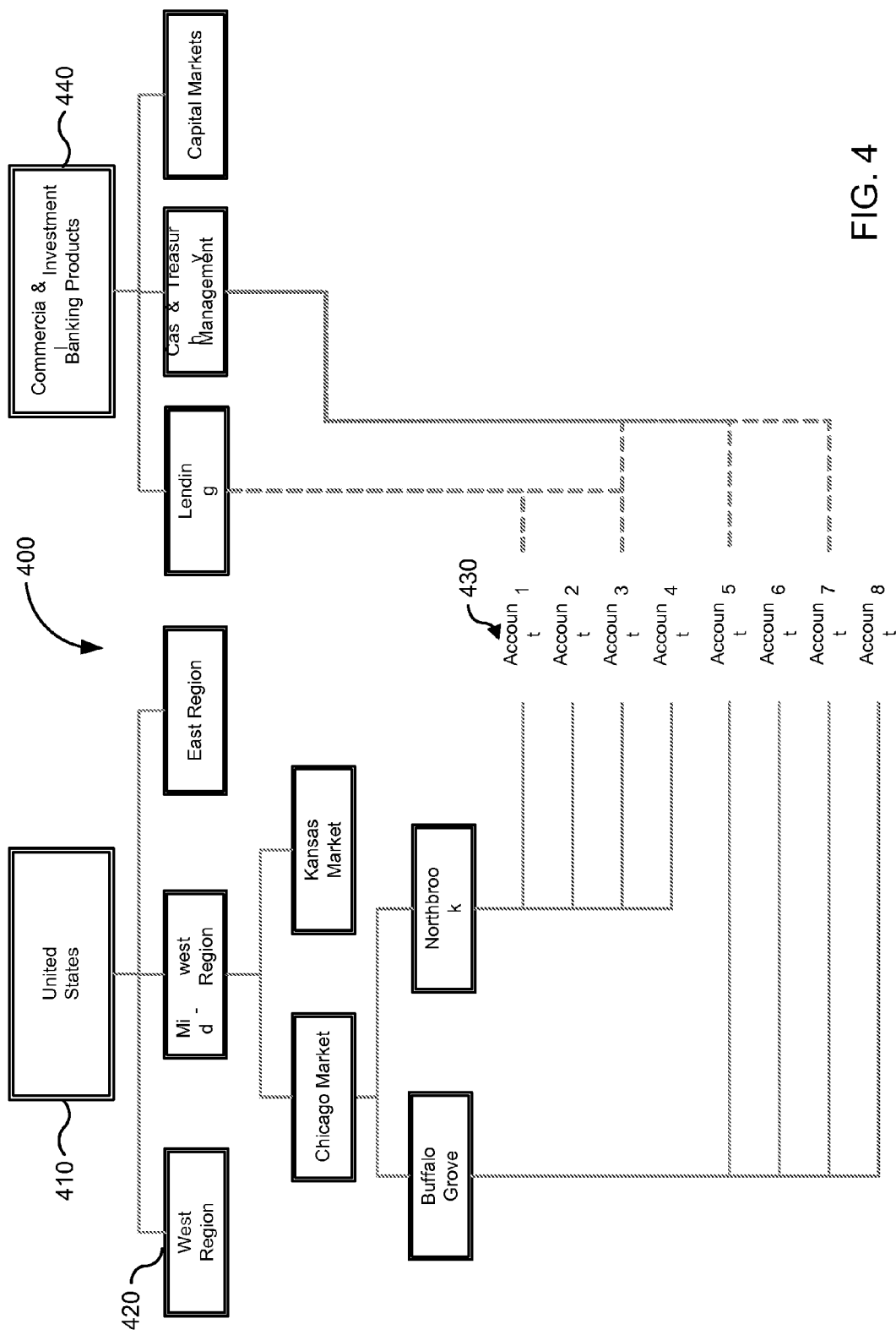
FIG. 4 is a block diagram illustrating an organization hierarchy that may be used to segment data in one embodiment according to the present invention.

FIG. 4 is a block diagram illustrating an organization hierarchy 400 that may be used to segment data in one embodiment according to the present invention. In this example, organization hierarchy 400 includes a segment 410 based on geography. Segment 410 includes the "United States" as the top level node.

Segment 410 may include one or more sub-nodes or levels. For example, sub-node 420 includes further segments based on "West Region," Mid-west Region," and "East Region." The "Mid-west Region" may be segmented further into the "Chicago Market" and the "Kansas Market." The "Chicago Market" may be further segmented into "Buffalo Grove" and "Northbrook."

Sub-groups or segments may include accounts 430. In various embodiments, accounts 440 represent the data in each segment. In this example, "Northbrook" includes accounts 1-4 and "Buffalo Grove" includes accounts 5-8.

Organization hierarchy 400 also includes a segment 440 based on product and/or services lines. Segment 440 includes "Commercial & Investment Banking Products." Segment 440 may include one or more sub-nodes or levels. For example, the product lines may be divided into "Lending," Cash & Treasury Management," and "Capital Markets." "Lending" may include accounts 1 and 4. "Cash & Treasury Management" may include accounts 4, 5, and 7.

FIG. 5 is a screenshot 500 illustrating one example of a user interface for creating a book of business in one embodiment according to the present invention. In this example, the user interface includes a book name section 510, a book type section 520, and a parent book section 530.

In general, a Book may be associated with a common or readily recognizable name. In some embodiments, the nature of the segment of grouping of the data lends itself to the name of the Book. For example, a set of Books may be named for the sub-levels of segments 510 and 540 of FIG. 5.

In various embodiments, a Book may be associated with a type. For example, a Book associated with segment 510 based on geography may indicate "Region," "Territory," "State," "City," "Market," and the like as the type. In another example, a Book associated with segment 540 may indicate "Product," "Service," "Division," and the like.

In some embodiments, a Book may be part of a "Book Hierarchy." For example, the Books associated with "Buffalo Grove" and "Northbrook" and children of the parent Book "Chicago Market" in FIG. 4.

FIG. 6 is a screenshot 600 illustrating one example of a user interface for manually associating data with a book of business in one embodiment according to the present invention. Typically, any record type can be associated with any Book that can contain data. As shown in FIG. 6, records can be associated with books manually. As indicated in FIG. 6, the source of the decision to associate the record with the book may be made visible to the end user and to the automated association process.

FIG. 7 is a screenshot 700 illustrating one example of a user interface for creating a business rule for automatically associating data with a book of business in one embodiment according to the present invention. In some embodiments, system 100 associates records with books through the automated application of the business rules.

FIG. 8 is a screenshot illustrating one example of a user interface for viewing and editing details of a book of business in one embodiment according to the present invention. In this example, the user interface includes key book information section 810, additional information section 820, sub-books section 830, and book users section 840 for a Book of business associated with "Oregon."

Key book information section 810 includes key or primary information associated with a Book. For example, key book information section 810 may include the name of the Book (e.g., "Oregon"), the Book type (e.g., "Market"), the parent of the Book (e.g., "Northwest"), as well as an indicator whether the Book can contain data. In this example, the "Oregon" Book does not directly contain data, but serves as an aggregator to "roll-up" or include further data segments from sub-books.

Additional information section 820 includes information, such as who created the Book, when the Book was created, who last modified the Book and when, and a description or memo portion. For example, the description may indicate that the "Oregon" Book includes "All territories" in the Oregon market.

Sub-books section 830 includes information associated with one or more Books that further segment or segment data associated with the current Book. In this example, the "Oregon" Book is further segmented into sub-books associated with "Bob's Territory," "Phil's Territory," and "Mary's Territory." Each sub-book is associated with a type (e.g., "Territory") and an indicator whether the Book can contain data.

In various embodiments, the user interface allows new sub-books to be added to the Book. For example, a "New" button may be clicked which instantiates a dialog box or interactive wizard to create a new Book. The user interface may further provide links, buttons, or other interface elements that allow the sub-books to be edited or removed. In some examples, only a portion of the sub-books is listed, and a full list may be shown in response to user input.

Book users section 840 includes information associated with one or more users. For example, the first and last name of the "owner" of a Book may be listed. In some embodiments, Book user section 840 of the user interface includes a Book role section 860. Book role section 860 indicates the role, position, or function of a user. For example, an indicator may be provided as to whether the user is the owner, administrator, delegate, and the like, of the Book.

In further embodiments, Book user section 840 of the user interface includes an access profile section 870. In general, users may be associated with Books to form a security subsystem. This security mechanism alters or makes changes to a query optimization subsystem to enforce the read security of the system. Users may have a classic "Many to Many" relationship with Books, which can be qualified by additional security descriptors for use elsewhere in the application. Access profile section 870 indicates the access profile or access control information associated with the user and determines the associated user's access rights on the Book and the subsequent children book data.

As discussed above, the "Book of Business" mechanism increases the end user's ability to access data quickly (and, hence, efficiently). Thus, database indexing efforts may be focused on queries that leverage book indexes. An infrastructure is also provided that allows the user to select the scope of their query (and hence controlling the candidate set). Furthermore, the organization or company administrator is allowed to divide the company's data in such a way that most of the user's day to day activity can be accomplished using a single-Book query with exactly the correct scope.

Figure 9:
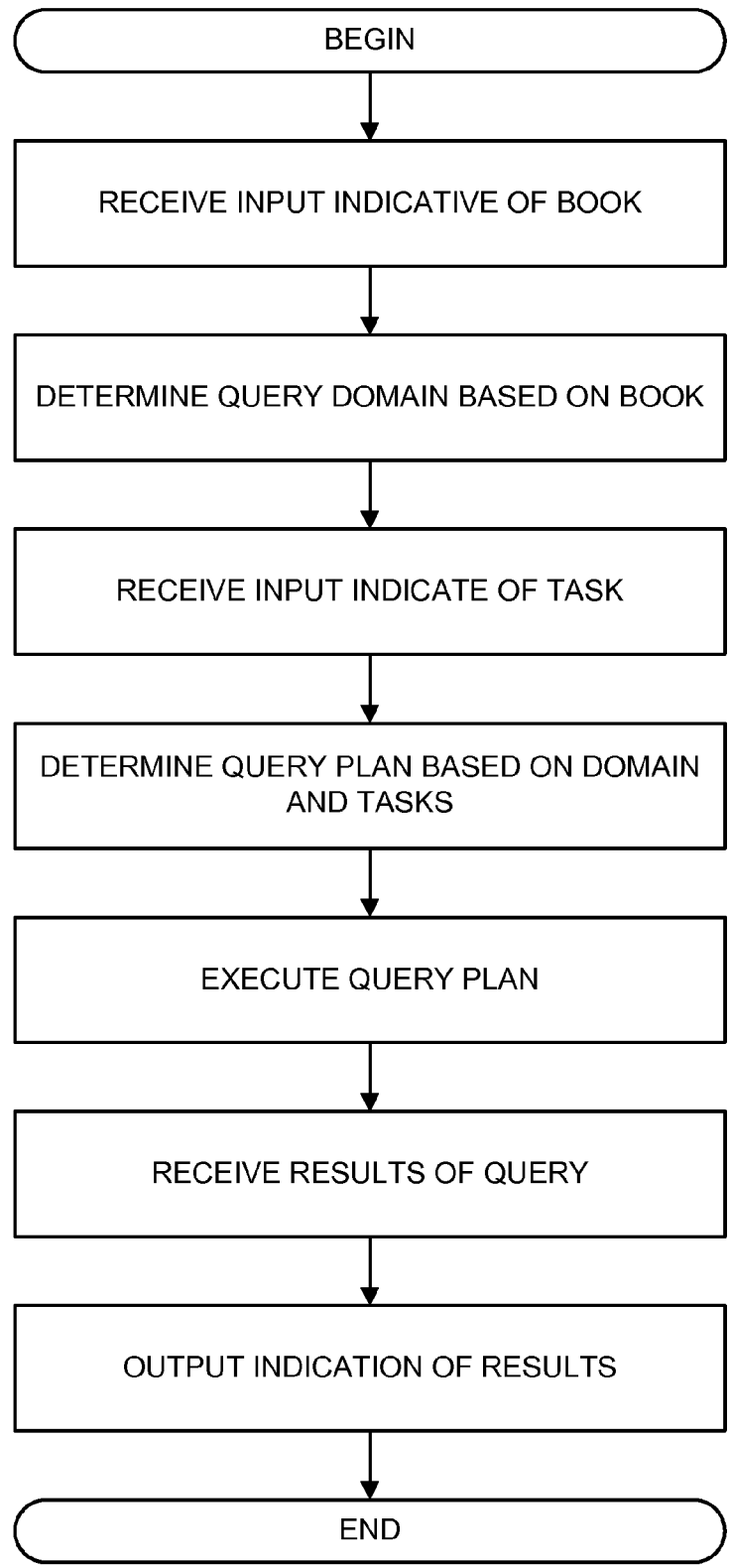
FIG. 9 is a flowchart of a method for accessing information using a book of business in one embodiment according to the present invention.

FIG. 9 is a flowchart of a method for accessing information using a book of business in one embodiment according to the present invention. FIG. 9 begins in step 900.

In step 910, input indicative of a book is received. For example, a user may select an icon representing a Book with a pointing device. In another example, the current Book associated with tasks performed by a user is received. In various embodiments, the Book contents are provided through the addition of a selection interface that is independent of the query selection interface. A client application (or user) may use a Book selection interface to choose zero or more Books. In general, the selected Books constitute the domain upon which subsequent query criteria act. Additionally, in some embodiments, selection of a series of Books can be done in an ad-hoc manner, or pre-existing book hierarchies may be leveraged to create the query domain. The Book selection is generally communicated to an underlying query optimization subsystem separate from the query criteria, and can be sent independently with each query.

In various embodiments, the "Book of Business" mechanism provides a default Book per data type for each system user. Default Books may be overridden with context Books. This may occur either explicitly, or as a result of applying a pre-defined query.

In step 920, a query domain is determined based on the Book. In general, a query domain is the set of data over which queries are restricted. In step 930, input indicative of a task is received.

In step 940, a query plan is determined based on the query domain and the tasks. In various embodiments, a query optimization subsystem takes a resulting tuple of a requested business query and a selected book domain, and formulates a data access plan for rapid data access that is based on the "Book" indexing pattern. This might be done directly using query structure and optimizer hints in a sophisticated database implementation. Alternatively, formulation might be done indirectly by creating a storage scheme and a query plan that leverages the particular characteristics of the target data store (such as storage locality) to ensure that data records are quickly retrieved given a book identifier.

In some embodiments, system 100 may copy key attributes into the book index entries as depicted in FIG. 3. System 100 may substitute the matching book index attributes to further constrain the domain of the query. In one embodiment, system 100 may automatically add hierarchical entries to the book index entries as depicted in FIG. 3. In a further embodiment, system 100 may substitute a more optimal book domain (or set of book domains) based on the performance characteristics of the target data store.

Typical query cases that are handled by the query optimization subsystem include: the "no book" case, the single Book case (a.k.a. "In-Book" queries), and the multiple Book case (a.k.a. "Cross-Book" queries).

An optimal access plan for a Book-based query operates by using the book indexes to tightly restricting the domain of records where the rest of the query characteristics must be tested. In one example, hints and SQL query formulation may be used to cause a relational database management system to choose an index with a Book identifier as the leading term in the driving index for the query. In this example, the query would be structured automatically such that subsequent terms chose any available alternate Book indexes that optimally serviced the desired sort order from the business query and contained as many query terms as possible.

In step 950, the query plan is executed. In various embodiments, the query plan may be optimized based on criteria, such as performance considerations. In step 960, a set of results is received in response to execution of the query plan. In some embodiments, result set filtering may occur at this stage to compensate for excess data retrieval resulting from query plan optimizations in step 940.

In step 970, one or more indications of the set of results are output. For example, the entire set of results may be output. In another example, the set of results may be filtered based on the tasks, and a relevant subset of the results may be output. The results may be displayed on a screen to a user, or communicated to another computer process for further processing. FIG. 9 ends in step 980.

Figure 10:
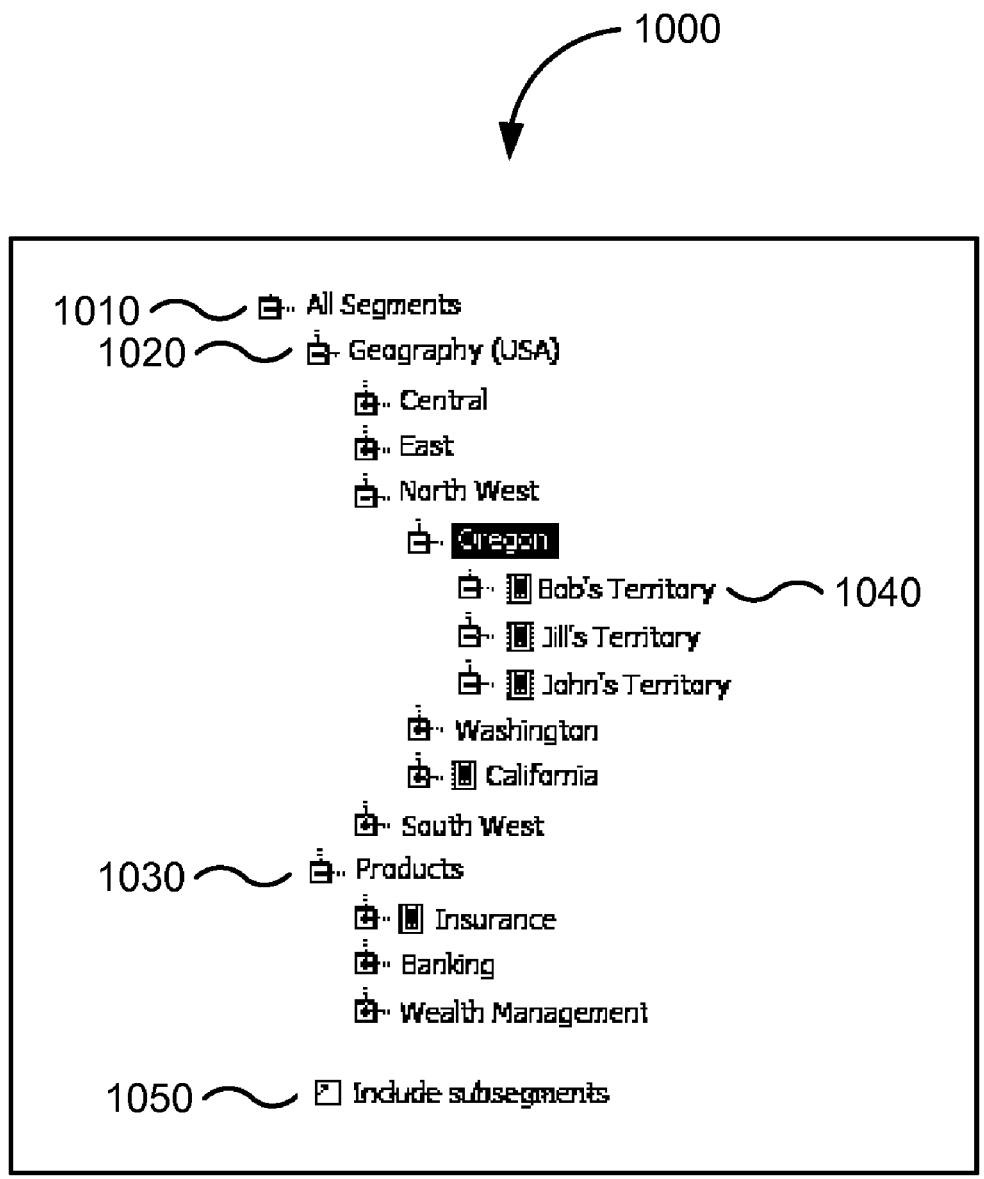
FIG. 10 is one example of a user interface for accessing information using a book of business in one embodiment according to the present invention.

FIG. 10 is one example of a user interface 1000 for accessing information using a book of business in one embodiment according to the present invention. In this example, the user interface 1000 includes Book 1010 representing "All Books." Book 1010 includes Book 1020 representing "Geography (USA)" and Book 1030 representing "Products." Book 1020 may include further books (sub-books), such as "Central," "East," "North West," and "South West." Book 1030 may include further books (sub-books), such as "Insurance," "Banking," and "Wealth Management."

In this example, the "North West" includes books for "Oregon," "Washington," and "California." The "Oregon" book includes "Bob's Territory," "Jill's Territory," and "John's Territory." Book 1040 represents "Bob's Territory."

In operation, a user (e.g., "Bob") may select Book 1040 to perform one or more tasks. A task may represent the day-to-day tasks, or 80% of the time work that Bob performs. In various embodiments, the user interface 1000 includes an indicator 1050 that may be selected to include sub-books. In other words, the segments of data represented by the sub-books may be included in operations or searches performed in the parent book.

As discussed previously, a nesting of books (e.g., FIG. 10) is created through a parent association to other books. The addition of a user may be used to serve as the owner of the Book. Qualification of the relationship between a Book and its data may be made with further attributes.

Accordingly, the "Book of Business Mechanism" gives a user the ability to control the performance of novel business queries by controlling the set of Books that participate in the query. The business-neutral structure allows Book content to be formulated based on performance needs, instead of business constraints such as the "owner" of the business data. The Book selector also allows choice of the set of Books and, hence, the amount of raw data considered by the query. Thus, the "Book of Business Mechanism" user gains the ability to control performance of the query because query performance is constrained to the cost of scanning and filtering the raw data. Hence, the "Book of Business Mechanism" user gains the ability to control performance without assistance from a DBA. As a result, the reach of pre-packaged business applications is extended to include the "high volume/low value/novel query" case.

Figure 11:
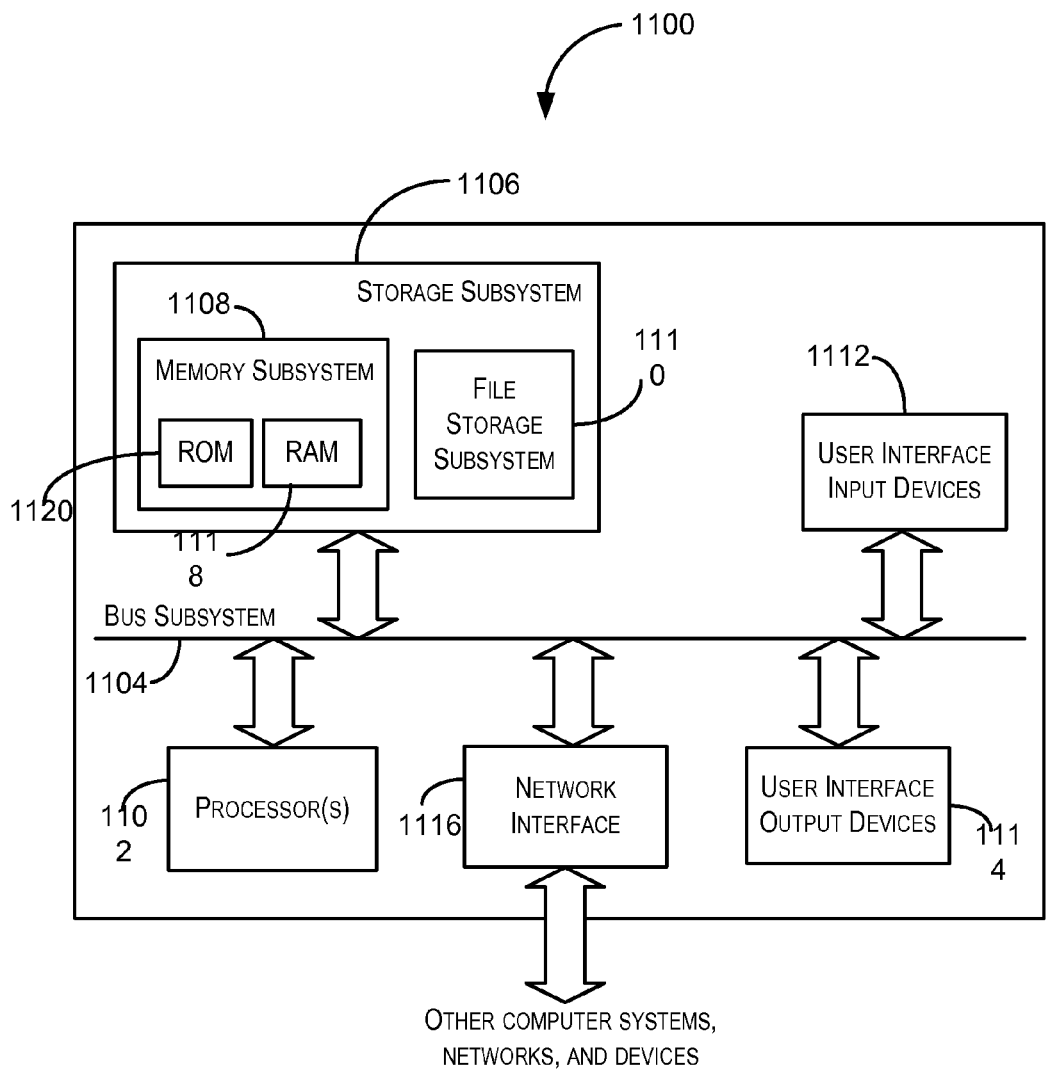
FIG. 11 is a simplified block diagram of a computer system that may be used to practice embodiments of the present invention.

FIG. 11 is a simplified block diagram of a computer system 1100 that may be used to practice embodiments of the present invention. As shown in FIG. 11, computer system 1100 includes a processor 1102 that communicates with a number of peripheral devices via a bus subsystem 1104. These peripheral devices may include a storage subsystem 1106, comprising a memory subsystem 1108 and a file storage subsystem 1110, user interface input devices 1112, user interface output devices 1114, and a network interface subsystem 1116.

Bus subsystem 1104 provides a mechanism for letting the various components and subsystems of computer system 1100 communicate with each other as intended. Although bus subsystem 1104 is shown schematically as a single bus, alternative embodiments of the bus subsystem may utilize multiple busses.

Network interface subsystem 1116 provides an interface to other computer systems, and networks, and devices. Network interface subsystem 1116 serves as an interface for receiving data from and transmitting data to other systems from computer system 1100.

User interface input devices 1112 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1100.

User interface output devices 1114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1100.

Storage subsystem 1106 may be configured to store the basic programming and data constructs that provide the functionality of the present invention. Software (code modules or instructions) that provides the functionality of the present invention may be stored in storage subsystem 1106. These software modules or instructions may be executed by processor(s) 1102. Storage subsystem 1106 may also provide a repository for storing data used in accordance with the present invention. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 1100 can be of various types including a personal computer, a portable computer, a workstation, a network computer, a mainframe, a kiosk, or any other data processing system. Due to the ever-changing nature of computers and networks, the description of computer system 1100 depicted in FIG. 11 is intended only as a specific example for purposes of illustrating the preferred embodiment of the computer system. Many other configurations having more or fewer components than the system depicted in FIG. 11 are possible.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for accessing a database from an application, the method comprising:
receiving, at one or more computer systems, information defining a hierarchy of business data containers for the application, each business data container in the hierarchy of business data containers limiting data access at the application to a subset of data stored in the database according to predetermined criteria, each business data container having:
one or more entries configured to cache first data obtained from the database at the application according to a data schema associated with the business data container, and
an index for the application indexing the one or more entries using or more key attributes of second data stored in the database;
receiving, at the one or more computer systems, information indicative of a selection of a user of a graphical user interface provided by the application of a visual representation of a business data container in the hierarchy of business data containers;
receiving, at the one or more computer systems, a query associated with a predefined task presented by the application for the selected business data container;
determining, with the one or more processors associated with one or more computer systems, a data domain for the selected business data container;
determining, with the one or more processors associated with one or more computer systems, the index for the selected business data container;
generating, with the one or more processors associated with the one or more computer systems, a query plan based on the query, the data domain, and the index associated with the selected business data container; and
executing, with the one or more processors associated with the one or more computer systems, the query plan to obtain a subset of the second data from the database.

2. The method of claim 1 wherein determining, with the one or more processors associated with one or more computer systems, a data domain for the selected business data container comprises determining one or more data segments based on a set of criteria.

3. The method of claim 1 wherein determining, with the one or more processors associated with one or more computer systems, a data domain for the selected business data container comprises determining the second data in a segment.

4. The method of claim 1 wherein each business data container specifies a set of predetermined queries.

5. The method of claim 1 further comprising:
determining the predefined task presented by the application from the business data container; and
receiving input in response to a user performing the predefined task.

6. The method of claim 1 further comprising:
determining ownership information associated with the business data container.

7. The method of claim 6 wherein generating, with the one or more processors associated with the one or more computer systems, the query plan based on the query, the data domain, and the index associated with the selected business data container further comprises generating the query plan based on the ownership information.

8. A non-transitory computer-readable medium storing computer-executable code for accessing a database from an application, the non-transitory computer-readable medium comprising:
code for receiving information defining a hierarchy of business data containers for the application, each business data container in the hierarchy of business data containers limiting data access at the application to a subset of data stored in the database according to predetermined criteria, each business data container having:
one or more entries configured to cache first data obtained from the database at the application according to a data schema associated with the business data container, and
an index for the application indexing the one or more entries using or more key attributes of second data stored in the database;
code for receiving information indicative of a selection of a user of a graphical user interface provided by the application of a visual representation of a business data container in the hierarchy of business data containers;
code for receiving a query associated with a predefined task presented by the application for the selected business data container;
code for determining a data domain for the selected business data container;
code for determining the index for the selected business data container;
code for generating a query plan based on the query, the data domain, and the index associated with the selected business data container; and
code for executing the query plan to obtain a subset of the second data from the database.

9. The non-transitory computer-readable medium of claim 8 wherein the code for determining a data domain for the selected business data container comprises code for determining one or more data segments based on a set of criteria.

10. The non-transitory computer-readable medium of claim 8 wherein the code for determining a data domain for the selected business data container comprises code for determining the second data in a segment.

11. The non-transitory computer-readable medium of claim 8 wherein each business data container specifies a set of predetermined queries.

12. The non-transitory computer-readable medium of claim 8 further comprising:
code for determining the predefined task presented by the application from the business data container; and
code for receiving input in response to a user performing the predefined task.

13. The non-transitory computer-readable medium of claim 8 further comprising:
code for determining ownership information associated with the business data container.

14. The non-transitory computer-readable medium of claim 13 wherein generating, with the one or more processors associated with the one or more computer systems, the query plan based on the query, the data domain, and the index associated with the selected business data container further comprises generating the query plan based on the ownership information.

15. A system comprising:
one or more computer systems configured to provide access to a database; and
one or more computer systems configured to host an application configured to:
receive information defining a hierarchy of business data containers for the application, each business data container in the hierarchy of business data containers limiting data access at the application to a subset of data stored in the database according to predetermined criteria, each business data container having:
one or more entries configured to cache first data obtained from the database at the application according to a data schema associated with the business data container, and
an index for the application indexing the one or more entries using or more key attributes of second data stored in the database;
receive information indicative of a selection of a user of a graphical user interface provided by the application of a visual representation of a business data container in the hierarchy of business data containers;
receive a query associated with a predefined task presented by the application for the selected business data container;
determine, with the one or more processors associated with one or more computer systems, a data domain for the selected business data container;
wherein either the one or more computer systems configured to provide access to the database or the one or more computer systems configured to host the application are configured to:
determine the index for the selected business data container;
generate a query plan based on the query, the data domain, and the index associated with the selected business data container; and
execute the query plan to obtain a subset of the second data from the database.

16. The system of claim 15 wherein to determine a data domain for the selected business data container the one or more computer systems configured to host the application are configured to determine one or more data segments based on a set of criteria.

17. The system of claim 15 wherein to determine a data domain for the selected business data container the one or more computer systems configured to host the application are configured to determine the second data in a segment.

18. The system of claim 15 wherein each business data container specifies a set of predetermined queries.

19. The system of claim 15 wherein the one or more computer systems configured to host the application are further configured to:
determining the predefined task presented by the application from the business data container; and
receiving input in response to a user performing the predefined task.

20. The system of claim 15 wherein the one or more computer systems configured to host the application are further configured to:
determining ownership information associated with the business data container.

* * * * *

UNITED STATES PATENT AND TRADEMARK OFFICE
CERTIFICATE OF CORRECTION

| | | |
|---|---|---|
| PATENT NO. | : 8,370,327 B2 | Page 1 of 1 |
| APPLICATION NO. | : 13/440206 | |
| DATED | : February 5, 2013 | |
| INVENTOR(S) | : Manson et al. | |

It is certified that error appears in the above-identified patent and that said Letters Patent is hereby corrected as shown below:

In the Specification

In column 5, line 21, delete "one ore more" and insert -- one or more --, therefor.

In column 5, line 21, delete "and or/application" and insert -- and/or application --, therefor.

In column 6, line 28, delete "my be" and insert -- may be --, therefor.

In the Claims

In column 14, in claim 1, line 11, delete "entries using or more key attributes of second data". and insert -- "entries using one or more key attributes of second data". --, therefor.

In column 15, in claim 8, line 8, delete "entries using or more key attributes of second data". and insert -- "entries using one or more key attributes of second data". --, therefor.

In column 16, in claim 15, line 12, delete "entries using or more key attributes of second data". and insert -- "entries using one or more key attributes of second data". --, therefor.

Signed and Sealed this
Twenty-fifth Day of August, 2015

Michelle K. Lee
*Director of the United States Patent and Trademark Office*